United States Patent [19]

Richardson

[11] Patent Number: 4,683,974

[45] Date of Patent: Aug. 4, 1987

[54] WARNING SYSTEM FOR VEHICLE AIR DAM

[75] Inventor: Truman R. Richardson, Warren, Mich.

[73] Assignee: General Motors Corporation, Detroit, Mich.

[21] Appl. No.: 851,955

[22] Filed: Apr. 14, 1986

[51] Int. Cl.$^4$ .............................................. B60R 21/00
[52] U.S. Cl. ................................ 180/274; 200/61.44; 296/1 S; 340/61
[58] Field of Search ................ 296/1 S, 91; 180/274; 340/61; 200/61.44

[56] References Cited

U.S. PATENT DOCUMENTS

| | | |
|---|---|---|
| 3,842,930 | 10/1974 | Fiala ..................................... 180/274 |
| 3,853,199 | 12/1974 | Hirashima et al. ................... 180/274 |
| 3,861,488 | 1/1975 | Hamala et al. ....................... 180/274 |
| 4,137,984 | 2/1979 | Jennings et al. ..................... 180/274 |
| 4,457,558 | 7/1984 | Ishikawa ............................... 296/1 S |
| 4,489,806 | 12/1984 | Shimomura .......................... 296/1 S |
| 4,558,897 | 12/1985 | Okuyama et al. .................... 296/1 S |

Primary Examiner—Richard A. Bertsch
Attorney, Agent, or Firm—Charles E. Leahy

[57] ABSTRACT

An air dam comprised of a molded plastic deflector panel is mounted beneath the front end structure of the vehicle forwardly of the front wheels. The deflector panel is subject to engagement with a parking bumper or other obstruction and is elastically yieldably movable upon such engagement within a certain range of elastic deformation and is subject to breakage upon deformation beyond the limit of the range of elastic deformation. A switch is mounted on the front end structure rearwardly of the molded plastic deflector panel and has an associated sensor which is operatively associated with the deflector panel and is adapted to actuate the switch in response to yielding movement of the deflector panel within the range of elastic deformation. A signal device is responsive to actuation of the switch in order to warn the vehicle operator that an obstruction has been engaged causing yieldable movement of the deflector panel within the range of elastic deformation and that a further forward movement of the vehicle may exceed the limit of the range of elastic deformation and thereby subject the deflector panel to breakage. The air deflector panel may be comprised of independently movable generally transverse central portion and wraparound corner portions at each end thereof in which case a switch means and associated sensor means may be provided for each of the independently movable portions of the deflector panel.

2 Claims, 3 Drawing Figures

WARNING SYSTEM FOR VEHICLE AIR DAM

The invention relates to a motor vehicle having a plastic air dam extending downwardly in front of the front wheels and more particularly provides a sensor and signal system for warning the vehicle operator that the air dam has engaged an obstruction and that further forward movement of the vehicle may subject the air dam to breakage.

BACKGROUND OF THE INVENTION

It is well known in motor vehicles to provide an air dam mounted on the underside of the front end structure of the vehicle body forwardly of the front wheels. The air dam structure lowers the aerodynamic drag of the vehicle and also improves the front end appearance of the vehicle by concealing from view underhanging elements of the front end suspension and the engine.

In the prior art the air dam is conventionally comprised of a molded plastic deflector panel which has a central portion extending generally transversely of the vehicle body and wraparound corner portions at each outer end which extend longitudinally of the vehicle for a short distance. Such an air dam may be comprised of a one piece plastic molding or the central portion may be molded separately from the corner portions.

The use of plastic for the front air dam is beneficial because, by proper selection of the plastic and the design of the shape of the deflector panel, the deflector panel is yieldable upon engagement against a concrete parking bumper or other obstruction. However, such a plastic deflector panel necessarily has limits to its yieldability and a further forward movement of the vehicle after engagement with the obstruction can lead to breakage of the deflector panel. In other circumstances, depending upon the height of the obstruction, the deflector panel is known to pass over the obstruction, but then when the vehicle is backed away from the obstruction the deflector panel becomes hung up and is subject to breakage.

It would be desirable to provide the vehicle operator with a warning of the impending possibility of damage to the deflector panel.

According to the present invention an air dam comprised of a molded plastic deflector panel is mounted beneath the front end structure of the vehicle forwardly of the front wheels. The deflector panel is subject to engagement with a parking bumper or other obstruction and is elastically yieldably movable upon such engagement within a certain range of elastic deformation and is subject to breakage upon deformation beyond the limit of the range of elastic deformation. A switch is mounted on the front end structure rearwardly of the molded plastic deflector panel and has an associated sensor which is operatively associated with the deflector panel and is adapted to actuate the switch in response to yielding movement of the deflector panel within the range of elastic deformation. A signal device is responsive to actuation of the switch in order to warn the vehicle operator that an obstruction has been engaged causing yieldable movement of the deflector panel within the range of elastic deformation and that a further forward movement of the vehicle may exceed the limit of the range of elastic deformation and thereby subject the deflector panel to breakage. The air deflector panel may be comprised of independently movable generally transverse central portion and wraparound corner portions at each end thereof in which case a switch means and associated sensor means may be provided for each of the independently movable portions of the deflector panel.

Accordingly, the object, feature and advantage of the invention resides in the provision of a switch and sensor means mounted on the front end structure rearwardly of a molded plastic deflector panel for warning the vehicle operator that an obstruction has been engaged and that the air dam has been yieldably moved within a range of elastic yieldable movement and that a further forward movement of the vehicle may exceed the limit of the range of elastic deformation and subject the deflector panel to breakage.

A further feature, object and advantage of the invention resides in the provision of a switch and sensor associated with each independently movable portion of the vehicle underbody air dam whereby to warn the vehicle operator of elastic yielding movement of that portion of the deflector panel so that the occupant may prevent a further forward movement of the vehicle which may exceed the limit of the range of elastic deformation and subject a portion of the deflector panel to breakage.

SUMMARY OF THE DRAWINGS

These and other features, objects and advantages of the invention will become apparent upon consideration of the following description of the preferred embodiment and the appended drawings in which.

DESCRIPTION OF THE PREFERRED EMBODIMENT

Figure 1:
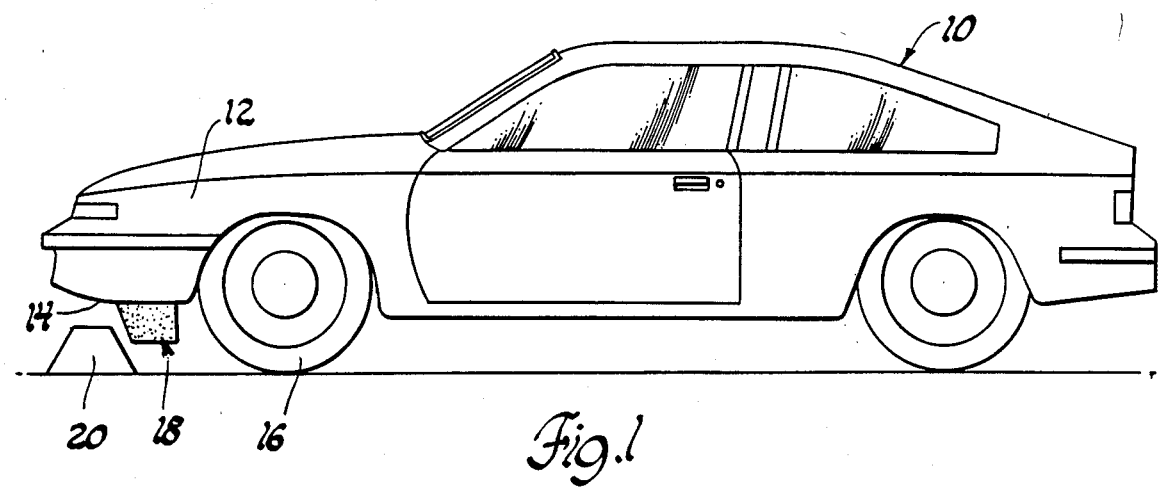
FIG. 1 is a side elevation view of a vehicle body having an underbody air dam according to the invention.

Referring to FIG. 1 there is shown a motor vehicle generally indicated at 10 having a front end structure 12 having an underbody 14 located forwardly of the front wheels 16. An air dam structure generally indicated at 18 is mounted on the underbody 14 of the front end structure 12 forwardly of the wheels 16 in order to improve the aerodynamics of the vehicle and to conceal the unsightly portions of the front suspension and the engine which may be visible beneath the front end structure 12. FIG. 1 also shows a concrete parking bumper 20 of the type commonly used in parking lots. The parking bumpers 20 are intended for engagement by the front wheels 16 of the motor vehicle to limit the forward movement of the vehicle. However, depending upon the loading of the vehicle body, the height of the curb 20 and other factors such as the accumulation of snow or other obstructions, the air dam 18 may engage with the curb 20 or other parking obstruction.

Figure 2:
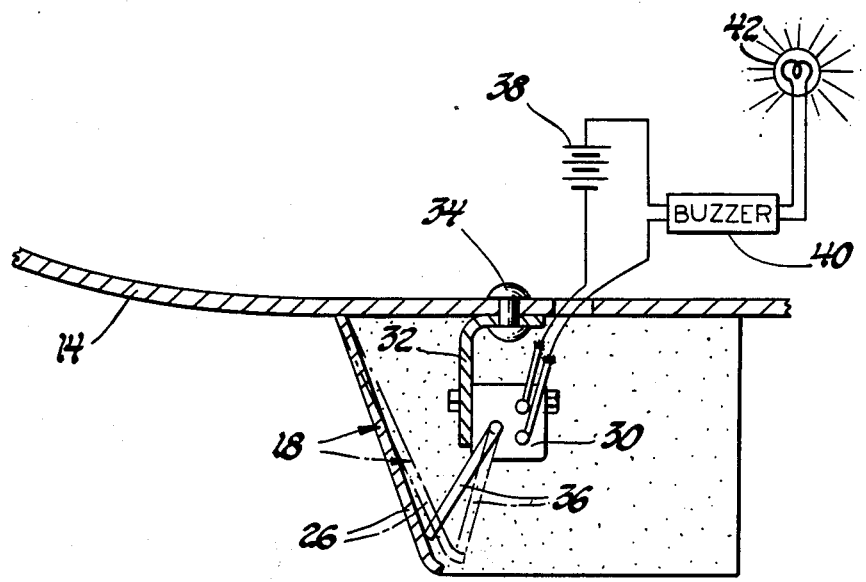
FIG. 2 is a side elevation enlarged fragmentary view of FIG. 1 having parts broken away and in section to show the air dam warning system of the invention.
Figure 3:
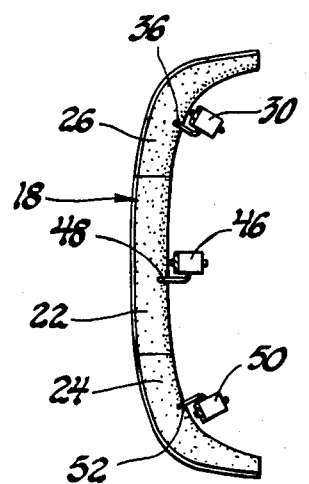
FIG. 3 is a plan view showing the arrangement of an air dam comprised of separate central portion and wraparound corner portions, each having an associated switch and sensor to actuate the warning system.

As best seen by reference to FIGS. 2 and 3, it will be understood that the air dam 18 is comprised of either a single molded plastic panel or, as shown in FIG. 3, a central panel 22 and wraparound corner panels 24 and 26. The air dam portions 22, 24 and 26 are preferably fastened together and yet remain somewhat independently movable of one another. For example, the corner portion 26 may engage with the parking curb 20 prior to engagement of the portions 22 and 24.

As best seen in FIG. 2, it will be understood that the engagement of the corner deflector panel 26 with the curb 20 will cause the deflections of the deflector panel from the solid line indicated position of FIG. 2 to a phantom-line indicated position of FIG. 2. Depending upon the selection of the material for the molded plastic, and depending upon the degree of stiffness contributed to that material by the curvature and flanges and other elements of the shape of the panel 26, the deflector panel will have a certain range of movement within which the deflector panel yields elastically so that it can be restored to its normal shape when the vehicle is backed away from the curb 20. However, should the vehicle continue forward, the deflector panel 26 will yield beyond the limits of the range of elastic deformation so that the air dam may be damaged.

According to the present invention, an electrical switch 30 is mounted on the underbody 14 by a bracket 32 and a rivet 34. A sensor arm 36 is connected to the switch 30 and extends downwardly therefrom into proximity with the deflector panel 26. The switch 30 is mounted behind the deflector panel 26 in order to be protected by the deflector panel. The sensor arm 36 functions to actuate the switch 30 upon movement of the deflector panel within the range of elastic deformation. The switch 30 is connected by wire with a battery 38, a buzzer 40 and a light 42. Actuation of the switch 30 by the sensor arm 36 closes the circuit to communicate current to the buzzer 40 and the light 42, thereby providing a visible and audible warning to the driver that the deflector panel 26 is undergoing an elastic deformation. Accordingly, the driver is warned that a further forward movement of the vehicle may cause a deformation of the deflector panel beyond the limit of the range of elastic deformation and thereby subject the deflector panel to breakage.

Referring again to FIG. 3, it is seen that the warning system, in addition to having a switch 30 and sensor arm 36 mounted behind the deflector panel 26 may also have a switch 46 and associated sensor arm 48 located behind the central deflector panel 22, and also a sensor switch 50 and sensor arm 52 located behind the deflector panel 24.

Accordingly, depending upon the point of contact with the parking bumper 20, the deflector panel portions may move independently of one another and yet the driver will be warned that a portion of the deflector panel may be damaged if the vehicle is moved further forward against the obstruction.

Thus, it is seen that the invention provides a new and improved underbody air dam for a motor vehicle having an associated warning means to permit the driver to avoid deforming the air deflector against a parking obstruction beyond the limit of elastic deformation of the plastic air dam.

The embodiments of the invention in which an exclusive property or privilege is claimed are defined as follows:

1. In combination, a motor vehicle having an air dam mounted upon and beneath the front end structure forwardly of the front wheels, said air dam being comprised of a molded plastic deflector panel being subject to engagement with a parking bumper or other obstruction and elastically yieldably movable upon such engagement within a range of elastic deformation and being breakable upon deformation beyond the limit of the range of elastic deformation, switch means mounted on the front end structure rearwardly of the molded plastic deflector panel and having associated sensor means operatively associated with the deflector panel and adapted to actuate the switch in response to yielding movement of the deflector panel within the range of elastic deformation, and signal means responsive to actuation of the switch means to warn the vehicle operator that an obstruction has been engaged and that further forward movement of the vehicle may exceed the limit of the range of elastic deformation and subject the plastic deflector panel to breakage.

2. In combination, a motor vehicle having an air dam mounted upon and beneath the front end structure forwardly of the front wheels, said air dam being comprised of a molded plastic deflector panel having a central portion extending generally transversely of the vehicle and wraparound corner portions at each end thereof being independently subject to engagement with a parking bumper or other obstruction and independently elastically yieldably movable upon such engagement within a range of plastic deformation and being breakable upon deformation beyond the limit of the range of elastic deformation, switch means mounted on the front end structure rearwardly of each independently movable portion of the molded plastic deflector panel and having associated sensor means operatively associated with the independently movable portion of the deflector panel and adapted to actuate the switch means in response to yielding movement of that portion of the deflector panel within the range of elastic deformation, and signal means responsive to actuation of the switch means to warn the vehicle operator that an obstruction has been engaged by at least a portion of the air dam and that further forward movement of the vehicle may exceed the limit of the range of elastic deformation and subject a portion of the plastic deflector panel to breakage.

* * * * *